United States Patent
Chaudhari et al.

(10) Patent No.: US 12,351,138 B2
(45) Date of Patent: Jul. 8, 2025

(54) SENSOR ASSEMBLY WITH CLEANING

(71) Applicant: Ford Global Technologies, LLC, Dearborn, MI (US)

(72) Inventors: Kunal Chaudhari, Westland, MI (US); Tyler D. Hamilton, Farmington, MI (US); Venkatesh Krishnan, Canton, MI (US); Subba Reddy Boggu, Prakasam Dist/Andhra Pradesh (IN)

(73) Assignee: Ford Global Technologies, LLC, Dearborn, MI (US)

( * ) Notice: Subject to any disclaimer, the term of this patent is extended or adjusted under 35 U.S.C. 154(b) by 264 days.

(21) Appl. No.: 18/066,296

(22) Filed: Dec. 15, 2022

(65) Prior Publication Data

US 2024/0198975 A1   Jun. 20, 2024

(51) Int. Cl.
| | | |
|---|---|---|
| *B60S 1/54* | (2006.01) | |
| *B60R 11/00* | (2006.01) | |
| *B60S 1/56* | (2006.01) | |
| *G01S 7/48* | (2006.01) | |
| *G01S 7/481* | (2006.01) | |
| *G01S 17/93* | (2020.01) | |
| *G01S 17/931* | (2020.01) | |

(52) U.S. Cl.
CPC ............ *B60S 1/54* (2013.01); *B60R 11/00* (2013.01); *G01S 7/4813* (2013.01); *B60R 2011/004* (2013.01); *G01S 17/931* (2020.01)

(58) Field of Classification Search
CPC . B60R 11/00; B60R 2011/004; G01S 17/931; G01S 2007/4977; G01S 7/4813; B60S 1/54
See application file for complete search history.

(56) References Cited

U.S. PATENT DOCUMENTS

| | | | | |
|---|---|---|---|---|
| 10,761,190 | B1 * | 9/2020 | Sykula | G01S 17/931 |
| 10,928,225 | B1 | 2/2021 | Krishnan et al. | |
| 11,598,865 | B2 * | 3/2023 | Hamilton | H04N 23/51 |
| 12,115,948 | B2 * | 10/2024 | Hamilton | G01S 7/4813 |
| 2021/0070389 | A1 | 3/2021 | Harada et al. | |
| 2022/0135005 | A1 * | 5/2022 | Yautz | B60S 1/54 134/37 |
| 2023/0011410 | A1 * | 1/2023 | Bake | G01S 7/4813 |
| 2024/0270178 | A1 * | 8/2024 | Robertson, Jr. | B60R 11/00 |
| 2024/0302499 | A1 * | 9/2024 | Robertson, Jr. | G01S 17/931 |

FOREIGN PATENT DOCUMENTS

| | | |
|---|---|---|
| DE | 102014111752 A1 | 2/2016 |
| WO | 2020058127 A1 | 3/2020 |

* cited by examiner

*Primary Examiner* — Andre J Allen
(74) *Attorney, Agent, or Firm* — Frank A. Mackenzie; Brooks Kushman P.C.

(57) ABSTRACT

A sensor assembly includes a sensor including a sensor window, a cover fixed relative to the sensor, a bracket supporting the sensor, a duct extending around the sensor from an inlet at the cover adjacent to the sensor to an outlet at the cover adjacent to the sensor on an opposite side of the sensor from the inlet, and a deflector fixed relative to the sensor and spaced downwardly from the sensor. The cover is positioned to expose at least a portion of the sensor window. The duct extends between the sensor and the bracket. The deflector is shaped to direct airflow toward the sensor.

20 Claims, 7 Drawing Sheets

SENSOR ASSEMBLY WITH CLEANING

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

Figure 1:
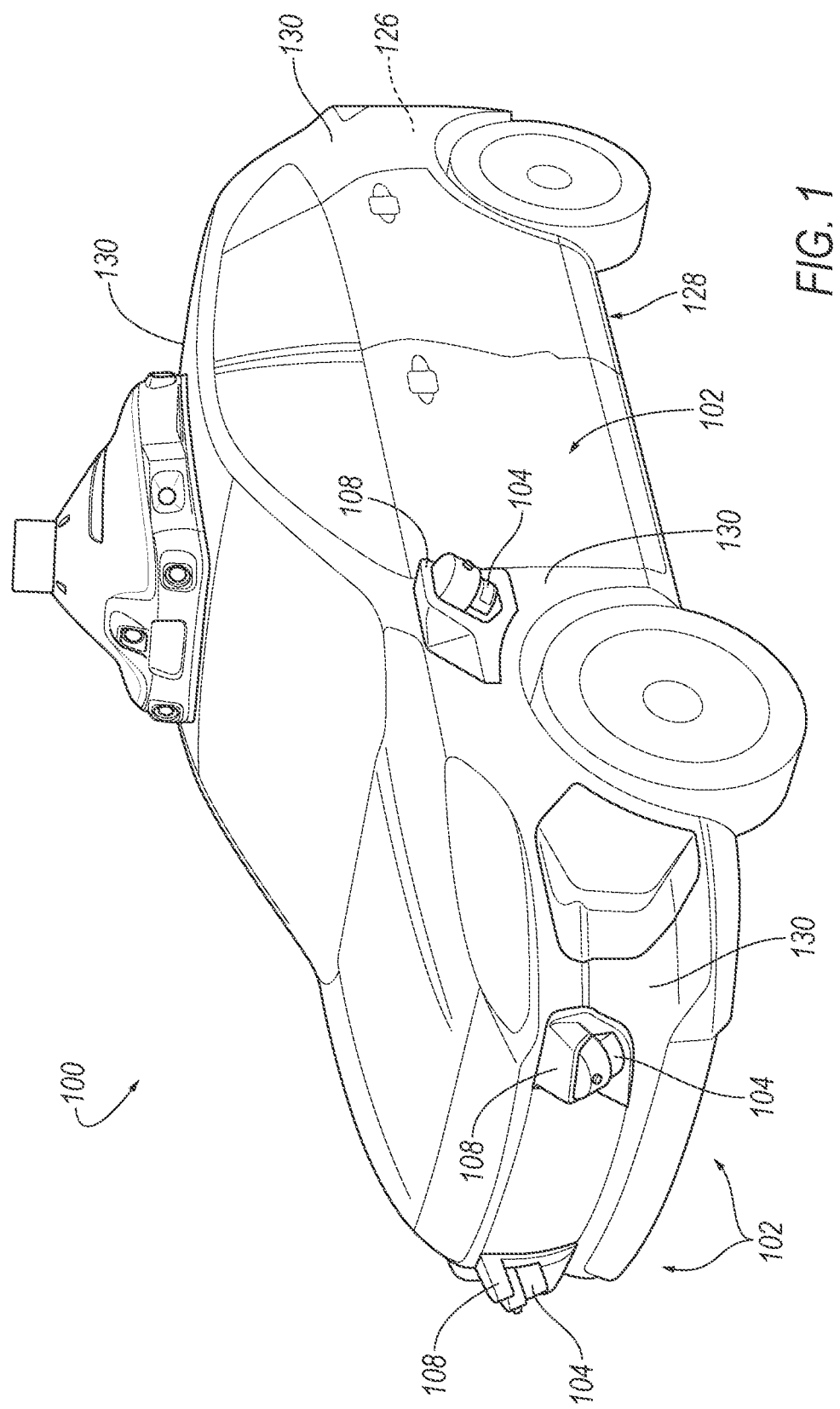
FIG. 1 is a perspective view of an example vehicle with sensor assemblies.

A sensor assembly includes a sensor including a sensor window, a cover fixed relative to the sensor, a bracket supporting the sensor, a duct extending around the sensor from an inlet at the cover adjacent to the sensor to an outlet at the cover adjacent to the sensor on an opposite side of the sensor from the inlet, and a deflector fixed relative to the sensor and spaced downwardly from the sensor. The cover is positioned to expose at least a portion of the sensor window. The duct extends between the sensor and the bracket. The deflector is shaped to direct airflow toward the sensor.

The inlet may be vehicle-forward of the sensor, and the outlet may be vehicle-rearward of the sensor.

The duct may extend vehicle-inboard of the sensor.

The deflector may be positioned directly below and partially vehicle-rearwardly of the sensor.

The deflector may slope upward in a vehicle-rearward direction.

The sensor window may be cylindrical and may define an axis, the cover may be positioned to expose a circumferential portion of the sensor window, and the circumferential portion may extend circumferentially relative to the axis from a first end adjacent to the cover to a second end adjacent to the cover. The inlet of the duct may be adjacent to the first end of the circumferential portion of the sensor window, and the outlet of the duct may be adjacent to the second end of the circumferential portion of the sensor window.

The circumferential portion may extend greater than 180° around the axis from the first end to the second end.

The sensor window may include a remaining portion extending behind the cover from the first end of the circumferential portion to the second end of the circumferential portion, and the duct may extend circumferentially along the remaining portion.

The inlet may be slot-shaped and may be elongated parallel to the axis. The inlet may be elongated from a bottom edge of the sensor window to a top edge of the sensor window.

The outlet may be slot-shaped and may be elongated parallel to the axis. The outlet may be elongated from a bottom edge of the sensor window to a top edge of the sensor window.

The sensor assembly may further include a frame member of a vehicle, and the bracket may be fixed to the frame member. The duct may extend between the sensor and the frame member.

The duct may be a first duct, the sensor assembly may further include a second duct, and the second duct may be positioned between the sensor and the bracket and may extend transverse to the first duct. The first duct may be positioned between the sensor and the second duct.

The second duct may include a second inlet positioned at an intake port through the cover below the sensor.

The sensor assembly may further include a blower mounted to the bracket and positioned to draw air into the second duct.

The sensor may be a LIDAR device.

With reference to the Figures, wherein like numerals indicate like parts throughout the several views, a sensor assembly 102 for a vehicle 100 includes a first sensor 104 including a sensor window 106, a cover 108 fixed relative to the first sensor 104, a bracket 132 supporting the first sensor 104, a first duct 198 extending around the first sensor 104 from a first inlet 200 at the cover 108 adjacent to the first sensor 104 to a first outlet 202 at the cover 108 adjacent to the first sensor 104 on an opposite side of the first sensor 104 from the first inlet 200, and a deflector 204 fixed relative to the first sensor 104 and spaced downwardly from the first sensor 104. The cover 108 is positioned to expose at least a portion of the sensor window 106. The first duct 198 extends between the first sensor 104 and the bracket 132. The deflector 204 is shaped to direct airflow toward the first sensor 104.

The first duct 198 and the deflector 204 can prevent dead zones in the airflow across the sensor window 106 of the first sensor 104. When dead zones form, fluid such as rain or washer fluid on the sensor window 106 may remain on the sensor window 106 instead of being blown off, which may diminish the data gathered by the first sensor 104. For example, while the vehicle 100 is traveling, airflow may build up where the sensor window 106 meets the cover 108. The position of the first inlet 200 of the first duct 198 can alleviate the buildup by providing a path for the air to flow through the first duct 198 behind the first sensor 104. For another example, while the vehicle 100 is traveling, the air flowing around the sensor window 106 can cause eddies as a result of the shape of the sensor window 106. The deflector 204 can direct airflow toward where the eddies can form, thereby breaking up the airflow that might cause eddying.

With reference to FIG. 1, the vehicle 100 may be any passenger or commercial automobile such as a car, a truck, a sport utility vehicle, a crossover, a van, a minivan, a taxi, a bus, etc.

The vehicle 100 can include a frame 126 and a body 128. The vehicle 100 may be of a unibody construction, in which the frame 126 and the body 128 of the vehicle 100 are a single component. The vehicle 100 may, alternatively, be of a body-on-frame construction, in which the frame 126 supports the body 128 that is a separate component from the frame 126. The frame 126 and body 128 may be formed of any suitable material, for example, steel, aluminum, etc.

The body 128 can include body panels 130 partially defining an exterior of the vehicle 100. The body panels 130 may present a class-A surface, e.g., a finished surface exposed to view by a customer and free of unaesthetic blemishes and defects.

The cover 108 of the sensor assembly 102 is disposed on and mounted to one of the body panels 130. For example, the cover 108 can be disposed on a front end of the vehicle 100 below windows of the vehicle 100, as shown in FIG. 1. While the discussion below is with respect to a single sensor assembly 102, the vehicle 100 can include multiple sensor assemblies 102, each with one cover 108 disposed on one of the body panels 130. The covers 108 can be arranged to provide the first sensors 104 therein with a collective field of view entirely around a front end of the vehicle 100 or around an entirety of the vehicle 100.

Figure 2:
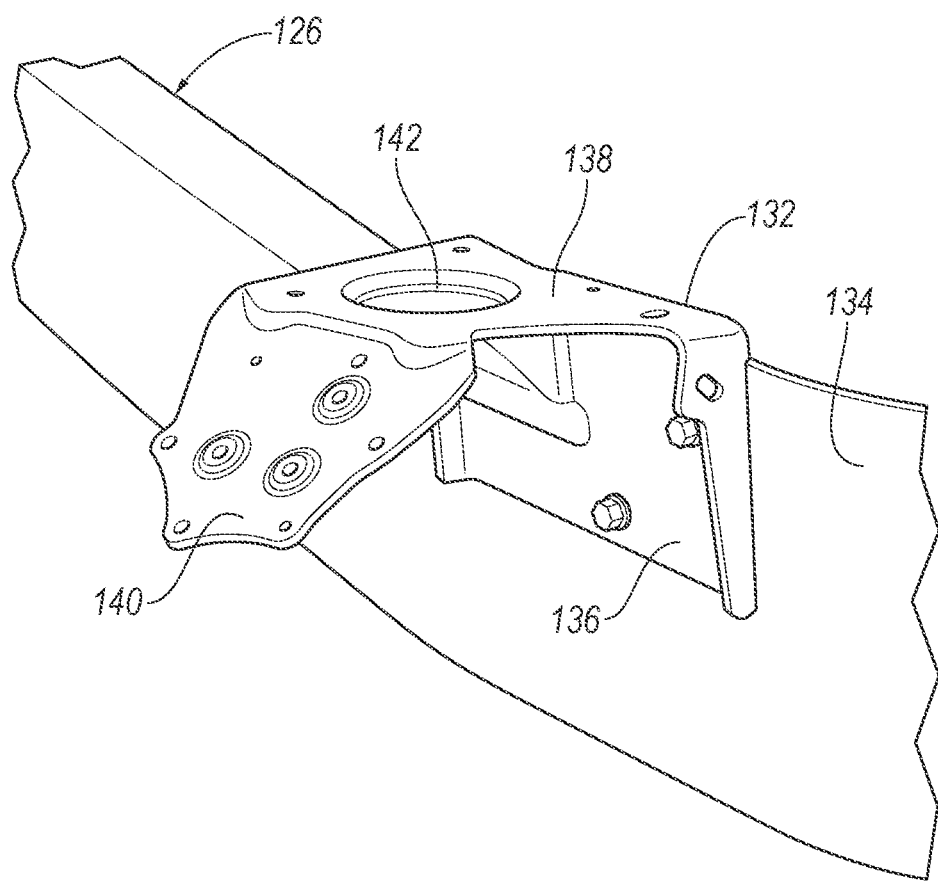
FIG. 2 is a perspective view of a bracket of one of the sensor assemblies attached to a frame of the vehicle.

With reference to FIG. 2, the sensor assembly 102 can include a bracket 132 and a frame member 134 of the frame 126. The bracket 132 can be fixed to the frame member 134, for example, welded or fastened, e.g., bolted, riveted, etc.

The bracket 132 can include a first panel 136, a second panel 138 extending from the first panel 136, and a third panel 140 extending from the second panel 138. The first panel 136, second panel 138, and third panel 140 can each be generally flat. The first panel 136 and second panel 138 can extend transverse to each other, and the second panel 138 and third panel 140 can extend transverse to each other. The first panel 136 can be spaced from the third panel 140. The first panel 136 can be fixed to the frame member 134, and the third panel 140 can be spaced from the frame member 134. The second panel 138 can include a bracket opening 142.

Figure 3:
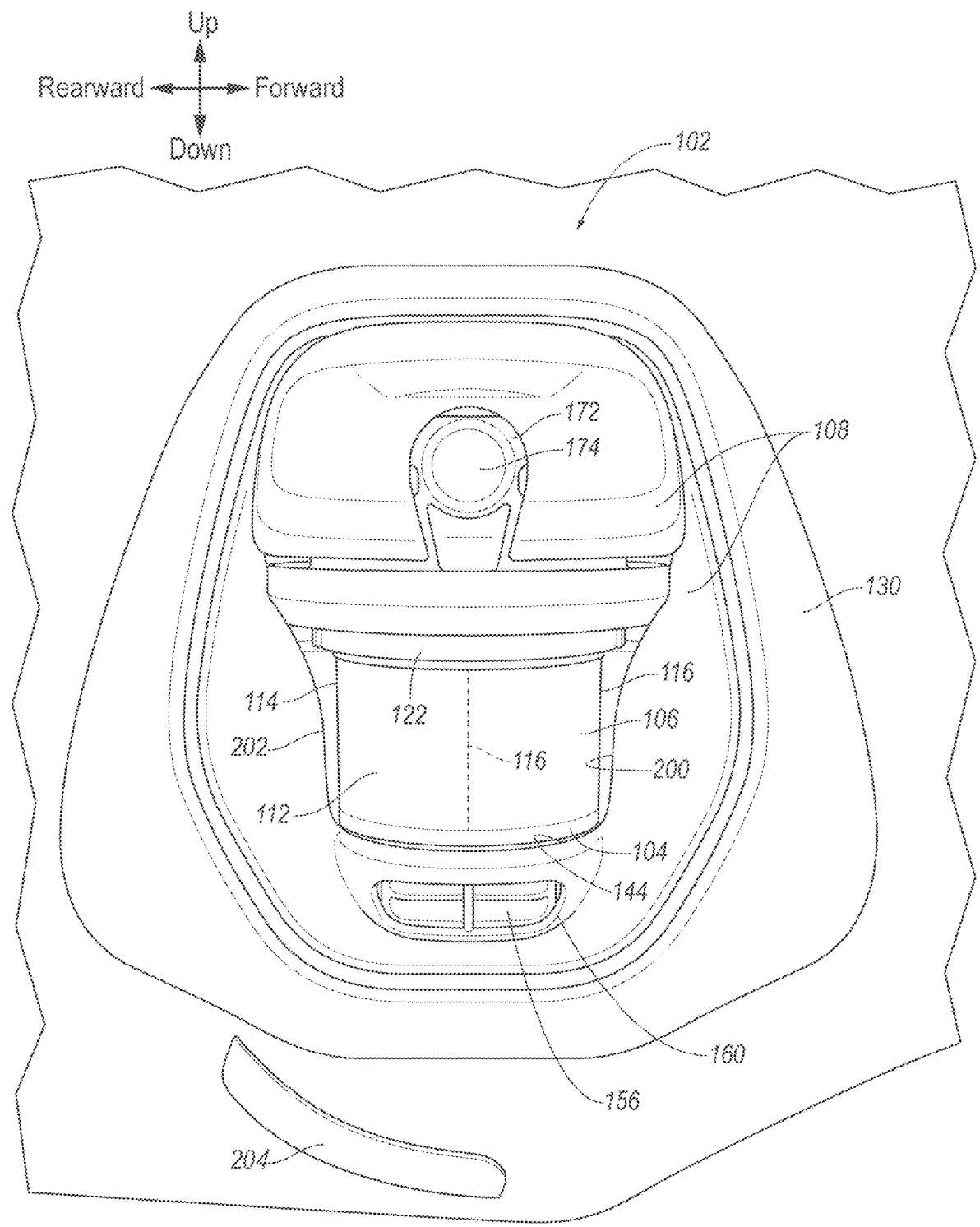
FIG. 3 is a front view of one of the sensor assemblies.
Figure 5:
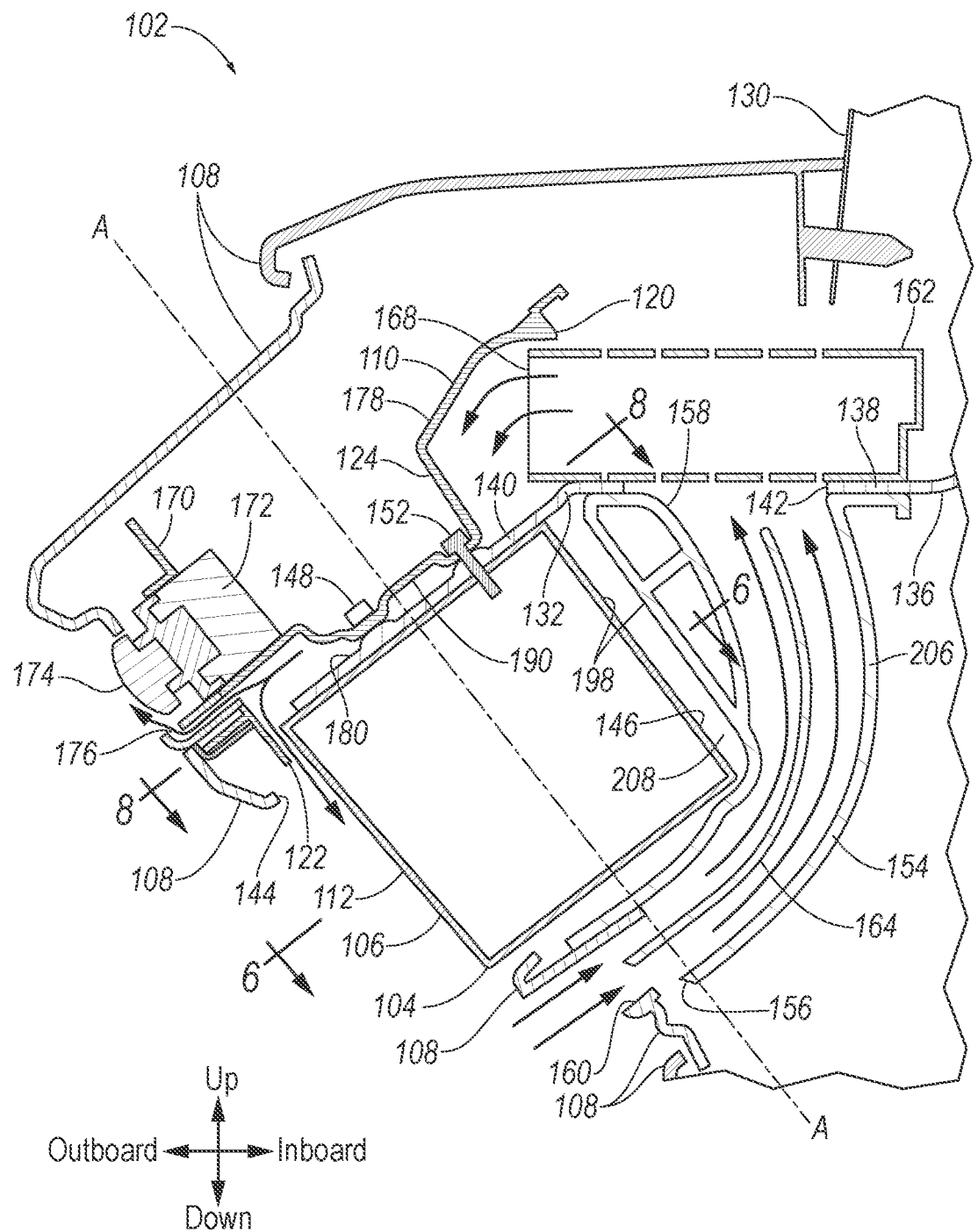
FIG. 5 is a side cross-sectional view of the sensor assembly.

With reference to FIG. 3, the sensor assembly 102 can include the cover 108 and one of the body panels 130 of the body 128. The cover 108 is fixed relative to the body panel 130 and extends from the body panel 130 in a direction away from the frame member 134, i.e., extends outward from the rest of the vehicle 100 (as shown in FIG. 5), e.g., extends vehicle-outboard if the sensor assembly 102 is positioned on a side of the vehicle 100. The cover 108 may present a class-A surface, e.g., a finished surface exposed to view by a customer and free of unaesthetic blemishes and defects. The cover 108 may include one or multiple pieces, e.g., two pieces as shown in FIG. 5.

The cover 108 can be fixed relative to the first sensor 104. For example, the cover 108 can be attached to the body panel 130, e.g., snapped to the body panel 130, which is fixed relative to the frame member 134. The bracket 132 is fixed to the frame member 134, and the first sensor 104 is attached to the bracket 132, as described below.

The cover 108 can be positioned to expose at least a portion, e.g., a circumferential portion 112, of the sensor window 106 of the first sensor 104. For example, the cover 108 can include a cover opening 144, and the first sensor 104 can extend into the cover opening 144. The first sensor 104 can be positioned so that a first end 114 and a second end 116 of the circumferential portion 112 are located at edges of the cover opening 144, so that the circumferential portion 112 faces outward from the vehicle 100 through the cover opening 144, and so that a remaining portion 146 of the sensor window 106 (shown in FIGS. 4-5) is behind the cover 108.

The first sensor 104 may detect the external world, e.g., objects and/or characteristics of surroundings of the vehicle 100, such as other vehicles, road lane markings, traffic lights and/or signs, pedestrians, etc. For example, the first sensor 104 may be a radar sensor, an ultrasonic sensor, a scanning laser range finder, a light detection and ranging (LIDAR) device, an image processing sensor such as a camera, etc. In particular, the first sensor 104 may be a LIDAR device, e.g., a scanning LIDAR device. A LIDAR device detects distances to objects by emitting laser pulses at a particular wavelength and measuring the time of flight for the pulse to travel to the object and back.

The first sensor 104 includes the sensor window 106. The sensor window 106 can be oriented generally vertically, i.e., extends up and down. The sensor window 106 can be cylindrical and can define the axis A, which can be oriented generally vertically. The sensor window 106 can extend around the axis A. The sensor window 106 can extend fully around the axis A, i.e., 360°, or partially around the axis A, e.g., from the first end 114 to the second end 116, thereby including only the circumferential portion 112. The sensor window 106 can extend along the axis A from a bottom edge positioned at a bottom edge of the cover opening 144 to a top edge positioned at a top edge of the cover opening 144. At least some of the sensor window 106, e.g., the circumferential portion 112, can be transparent with respect to whatever medium the sensing device is capable of detecting. For example, if the first sensor 104 is a LIDAR device, then the sensor window 106 can be transparent with respect to visible light at the wavelength generated and detectable by the first sensor 104. The field of view of the first sensor 104 extends through the sensor window 106.

Figure 4:
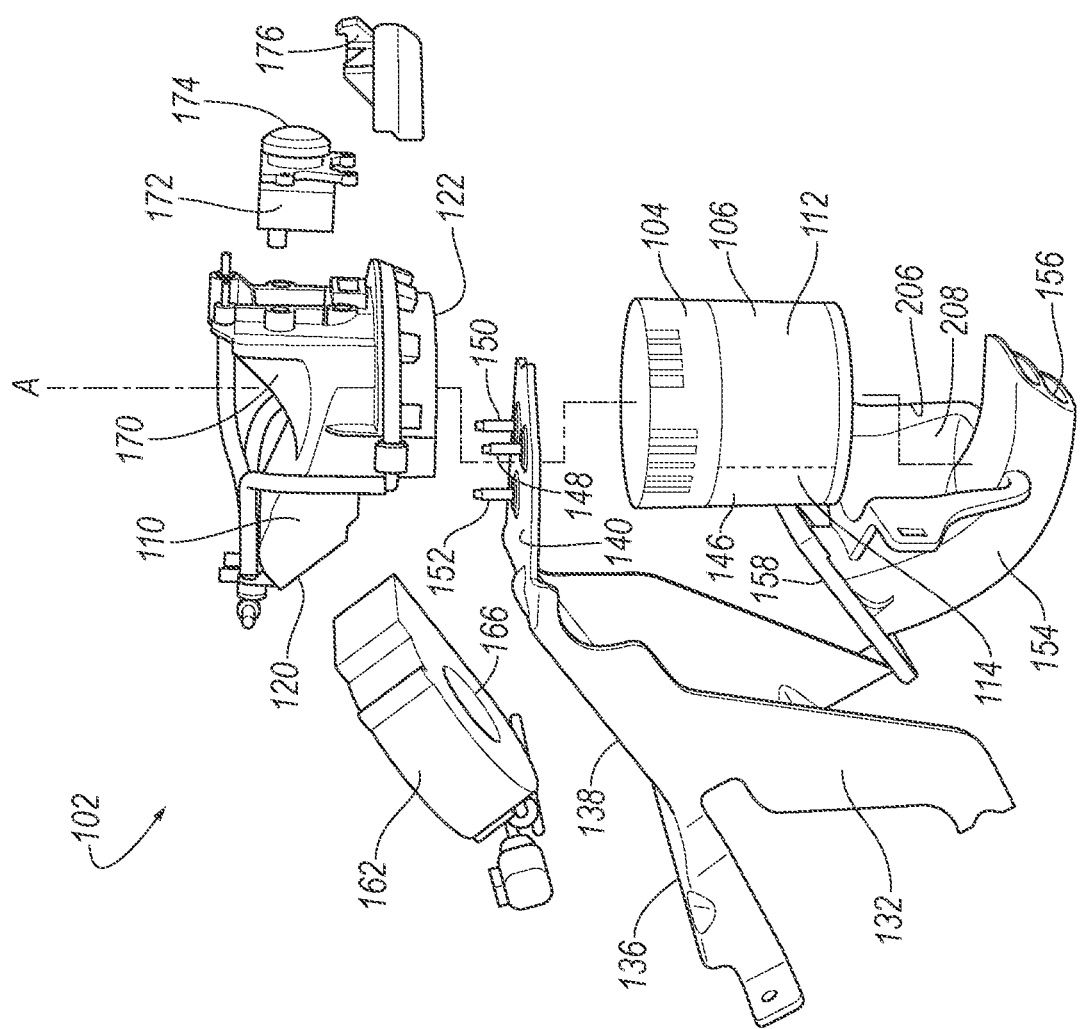
FIG. 4 is a perspective exploded view of the sensor assembly.

The sensor window 106 includes the circumferential portion 112 and may include the remaining portion 146 (shown in FIGS. 4-5). The circumferential portion 112 can extend circumferentially relative to the axis A from the first end 114 adjacent to the cover 108, e.g., at an edge of the cover opening 144, to a second end 116 adjacent to the cover 108, e.g., at an opposite edge of the cover opening 144. The circumferential portion 112 can extend greater than 180° around the axis A from the first end 114 to the second end 116. The circumferential portion 112 can include a midpoint 118 circumferentially between the first end 114 and the second end 116. The midpoint 118 is spaced from the first end 114 and the second end 116, e.g., equidistant from the first end 114 and the second end 116 in a plane orthogonal to the axis A. The remaining portion 146 can extend behind the cover 108 circumferentially relative to the axis A from the first end 114 to the second end 116.

The sensor assembly 102 includes the deflector 204. The deflector is fixed relative to the first sensor 104. The deflector 204 can be positioned directly below and partially vehicle-rearwardly of the first sensor 104. For example, some of the deflector 204 can be directly below the first sensor 104, and the rest of the deflector 204 can be below and in a vehicle-rearward direction from, i.e., behind relative to a forward direction of travel of the vehicle 100, the first sensor 104. For example, the deflector 204 may be mounted on the body panel 130, as shown in FIG. 3. For another example, the deflector 204 may be mounted on the cover 108 or partially on the cover 108 and partially on the body panel 130.

The deflector 204 can be shaped to direct airflow toward the first sensor 104, e.g., toward the circumferential portion 112 of the sensor window 106 of the first sensor 104. For example, the deflector 204 can be shaped to direct airflow toward a point behind the midpoint 118 of the circumferential portion 112, e.g., a point closer to the midpoint 118 than to the second end 116. The airflow can be generated by forward motion of the vehicle 100. The deflector 204 can slope upward in a vehicle-rearward direction, e.g., the deflector 204 can be elongated from a vehicle-forward end diagonally upward and rearward to a vehicle-rearward end. A slope of the deflector can increase from the vehicle-forward end to the vehicle-rearward end. The deflector 204 can have a smoothly curving shape from the vehicle-forward end to the vehicle-rearward end, i.e., a shape without sharp corners.

With reference to FIGS. 4 and 5, the first sensor 104 is fixed to the bracket 132, e.g., fastened to the bracket 132. For example, the first sensor 104 can be fastened to the third panel 140 of the bracket 132 by a plurality of fasteners 148, 150, 152, e.g., a first fastener 148, a second fastener 150, and a third fastener 152 (shown in FIG. 8). The first sensor 104 can hang below the third panel 140 of the bracket 132, i.e., can be positioned below the third panel 140 of the bracket 132 and be supported by the third panel 140 of the bracket 132. This position can reduce dimensional stackup by permitting more components to be attached to just one bracket 132.

The sensor assembly 102 can include a second duct 154 mounted to the bracket 132. For example, the second duct 154 can be fastened to the second panel 138 of the bracket 132.

The second duct 154 can extend from a second inlet 156 to a second outlet 158. The second duct 154 can be positioned between the first sensor 104 and the bracket 132. The second inlet 156 can be positioned to draw airflow from outside the sensor assembly 102. For example, the second inlet 156 can be positioned at an intake port 160 of the cover 108 that passes through the cover 108 below the first sensor 104. The intake port 160 can permit airflow through the cover 108. The second outlet 158 can be positioned to exhaust airflow into a blower 162 (described below). For example, the second outlet 158 can be positioned adjacent and concentric to the bracket opening 142 and positioned to exhaust airflow through the bracket opening 142.

The second duct 154 can have a smoothly curving shape from the second inlet 156 to the second outlet 158, i.e., a shape without sharp corners. The second duct 154 can have a constant cross-sectional area from the second inlet 156 to the second outlet 158. The shape and/or cross-sectional area can help promote laminar airflow reaching the blower 162, which allows a greater quantity of air to reach the blower 162 for greater output by the blower 162. The second duct 154 can extend through the axis A defined by the sensor window 106 on an opposite side of the first sensor 104 as the third panel 140 of the bracket 132 to which the first sensor 104 is fastened; i.e., the second duct 154 can extend through the axis A below the first sensor 104.

The second duct 154 can include a vane 164 bisecting the duct from the second inlet 156 to the second outlet 158. The vane 164 can divide the second duct 154 into two channels having equal cross-sectional area as each other from the second inlet 156 to the second outlet 158. The vane 164 can extend horizontally across the cross-section of the second duct 154. The vane 164 can help promote laminar airflow reaching the blower 162 for greater output by the blower 162.

The blower 162 increases the pressure of a gas by reducing a volume of the gas or by forcing additional gas into a constant volume. The blower 162 may be any suitable type, e.g., positive-displacement such as a reciprocating, ionic liquid piston, rotary screw, rotary vane, rolling piston, scroll, or diaphragm; dynamic such as an air bubble, centrifugal, diagonal, mixed-flow, or axial-flow; or any other suitable type.

The blower 162 is mounted to the bracket 132. For example, the blower 162 can be fastened to the second panel 138 of the bracket 132 on an opposite side as the second duct 154.

The blower 162 is positioned to draw air from the second duct 154 and blow air into a third duct 110. For example, the blower 162 can include a blower inlet 166 positioned adjacent and concentric to the bracket opening 142 on an opposite side of the second panel 138 from the second outlet 158 of the second duct 154, so as to receive airflow from the second outlet 158 through the bracket opening 142. The blower 162 can include a blower outlet 168 positioned adjacent to a third inlet 120 of the third duct 110, so that airflow exhausted from the blower 162 through the blower outlet 168 enters the third duct 110 through the third inlet 120.

The third duct 110 is mounted to the first sensor 104. For example, the third duct 110 can be fastened to the first sensor 104 through the bracket 132, e.g., the third panel 140 of the bracket 132. The third duct 110 can be positioned on an opposite side of the third panel 140 of the bracket 132 as the first sensor 104, i.e., the bracket 132 can be positioned between the first sensor 104 and the third duct 110, e.g., directly between the first sensor 104 and the third duct 110, e.g., between the first sensor 104 and the third duct 110 along the axis A. The third duct 110 and the bracket 132 can extend through the axis A on top of the first sensor 104.

The sensor assembly 102 includes the first fastener 148, the second fastener 150, and the third fastener 152. The first fastener 148, second fastener 150, and third fastener 152 can fix the first sensor 104 and the third duct 110 to the bracket 132, and the bracket 132 can thereby support the first sensor 104 and the third duct 110. For example, the first fastener 148, second fastener 150, and third fastener 152 can extend through the third duct 110 and through the bracket 132 into the first sensor 104.

The sensor assembly 102 can include a second-sensor frame 170 for a second sensor 172. For example, the third duct 110 can include the second-sensor frame 170, e.g., the second-sensor frame 170 can be integral with the third duct 110, i.e., made of a single, uniform piece of material with no seams, joints, fasteners, or adhesives holding it together. The second-sensor frame 170 can extend upward from the third duct 110, i.e., in a direction along the axis A away from the bracket 132 and the first sensor 104.

The sensor assembly 102 includes the second sensor 172. The second sensor 172 may detect the external world, e.g., objects and/or characteristics of surroundings of the vehicle 100, such as other vehicles, road lane markings, traffic lights and/or signs, pedestrians, etc. For example, the second sensor 172 may be a radar sensor, an ultrasonic sensor, a scanning laser range finder, a light detection and ranging (LIDAR) device, an image processing sensor such as a camera, etc. In particular, the second sensor 172 can be a camera and can detect electromagnetic radiation in some range of wavelengths. For example, the second sensor 172 may detect visible light, infrared radiation, ultraviolet light, or some range of wavelengths including visible, infrared, and/or ultraviolet light. For example, the camera can be a charge-coupled device (CCD), complementary metal oxide semiconductor (CMOS), or any other suitable type. The second sensor 172 can include a sensor lens 174.

The second sensor 172 can be mounted to the bracket 132. For example, the second sensor 172 can be fixed to, e.g., snapped into, the second-sensor frame 170 of the third duct 110, and the third duct 110 can be fastened to the third panel 140 of the bracket 132. The second sensor 172 can be positioned on an opposite side of the bracket 132, e.g., on an opposite side of the third panel 140 of the bracket 132 along the axis A, from the first sensor 104.

The third duct 110 extends from the third inlet 120 to a third outlet 122 and to a second-sensor outlet 176. The third duct 110 defines an airflow path from the third inlet 120 to the third outlet 122 and the second-sensor outlet 176. The third duct 110 extends through the axis A. The third inlet 120 is positioned to receive airflow from the blower 162. The third outlet 122 is positioned to direct airflow across the circumferential portion 112 of the sensor window 106. The third outlet 122 can direct airflow in a downward direction generally parallel to the axis A from the top edge of the circumferential portion 112 toward the bottom edge of the circumferential portion 112. The second-sensor outlet 176 can be positioned to direct airflow to the second sensor 172, e.g., across the sensor lens 174. The second-sensor outlet 176 can direct airflow in an upward direction generally parallel to the axis A.

The third duct 110 includes a duct deflector 124. The duct deflector 124 can extend downward relative to the axis A from a top panel 178 of the third duct 110 to a top surface 180 of the third panel 140 of the bracket 132. The top panel 178 of the duct deflector 124 can include a gap circumscribed by the duct deflector 124. The first fastener 148, second fastener 150, and third fastener 152 can extend through a bottom panel 190 of the duct deflector 124 circumscribed by the duct deflector 124. The duct deflector 124 thereby permits access to the fasteners 148, 150, 152 during assembly.

Figure 6:
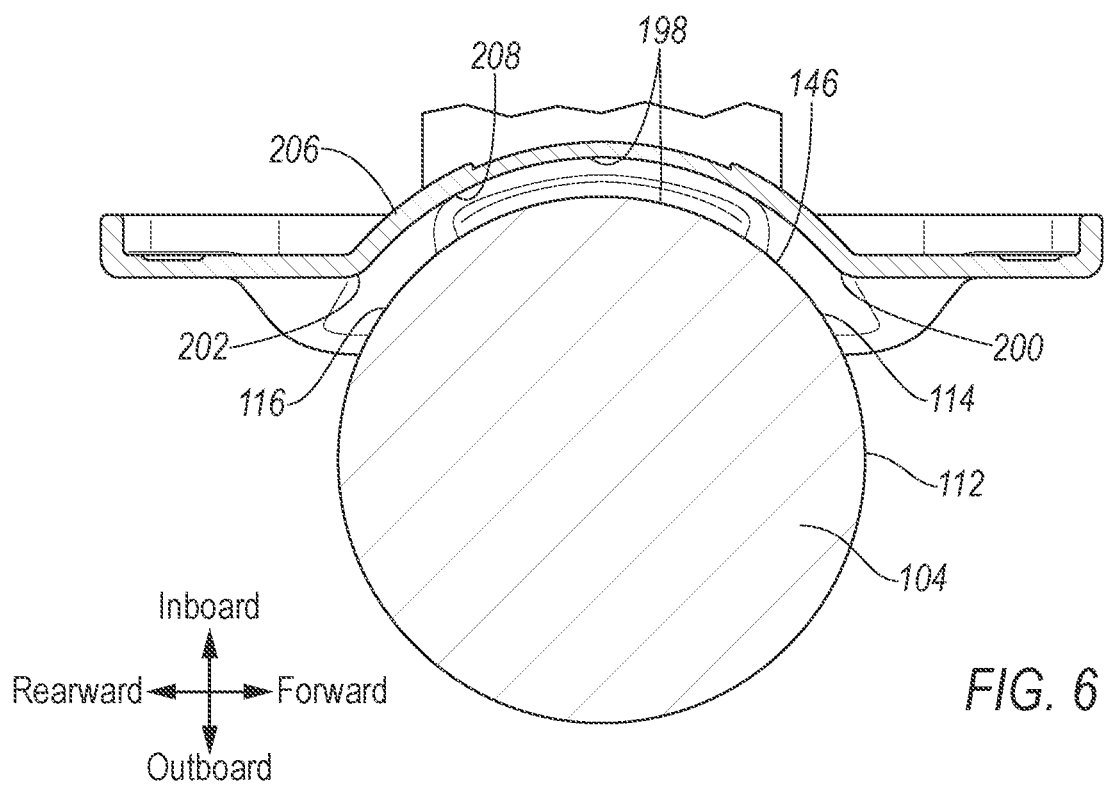
FIG. 6 is a top cross-sectional view through line 6-6 in FIG. 5 of the sensor assembly.

With reference to FIG. 6, the first duct 198 extends vehicle-inboard of the first sensor 104. The first duct 198 extends between the first sensor 104 and the bracket 132 and between the first sensor 104 and the frame member 134. For example, the first duct 198 can be positioned between the first sensor 104 and the second duct 154, and the second duct 154 can be positioned between the first sensor 104 and the bracket 132 and/or the frame member 134, as shown in FIG. 5. Positioning the second duct 154 further inboard than the first duct 198 can accommodate the smoothly curving shape of the second duct 154.

The first duct 198 extends around the first sensor 104 from the first inlet 200 at the cover 108 adjacent to the first sensor 104 to the first outlet 202 at the cover 108 adjacent to the first sensor 104 on an opposite side of the first sensor 104 from the first inlet 200. For example, the first duct 198 can extend circumferentially along the remaining portion 146 of the sensor window 106 of the first sensor 104 from the first inlet 200 to the first outlet 202. The first duct 198 can define a flow path for air from the first inlet 200 to the first outlet 202, e.g., circumferentially along the remaining portion 146 of the sensor window 106. The second duct 154 can extend transverse to the first duct 198, e.g., the second duct 154 can be elongated mainly vertically, and the first duct 198 can be elongated mainly horizontally. The first duct 198 can have a constant cross-sectional area from the first inlet 200 to the first outlet 202.

Returning to FIG. 3, the first inlet 200 can be adjacent to the first end 114 of the circumferential portion 112 of the sensor window 106, and the first outlet 202 can be adjacent to the second end 116 of the circumferential portion 112 of the sensor window 106. For example, the first inlet 200 and first outlet 202 can be defined by gaps between the sensor window 106 and the cover 108. The first inlet 200 can be vehicle-forward of the first sensor 104, and the first outlet 202 can be vehicle-rearward of the first sensor 104. When the vehicle 100 travels forward, the first duct 198 thus serves as a flowpath for air from the first inlet 200 to the first outlet 202.

The first inlet 200 and first outlet 202 can be slot-shaped and elongated parallel to the axis A. For example, the first inlet 200 and first outlet 202 can be elongated from the bottom edge of the sensor window 106 to the top edge of the sensor window 106. The first inlet 200 and first outlet 202 can have a constant width measured perpendicular to the direction of elongation from the bottom edge of the sensor window 106 to the top edge of the sensor window 106. The constant width can be significantly smaller than a height of the sensor window 106 from the bottom edge to the top edge. The shape of the first inlet 200 and first outlet 202 can provide full coverage of a potential dead zone at the first end 114 of the circumferential portion 112 while maximizing coverage by the cover 108. The first duct 198 can have the same height and width from the first inlet 200 to the first outlet 202. Having the same cross-section from the first inlet 200 to the first outlet 202 can promote smooth airflow.

Figure 7:
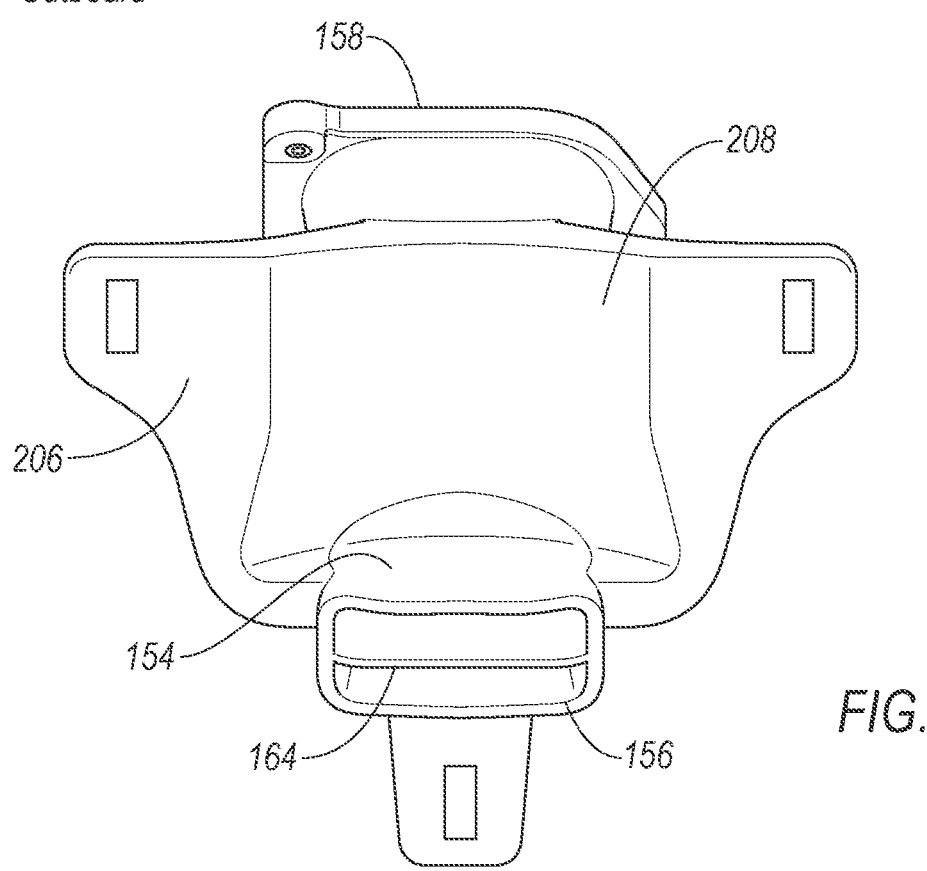
FIG. 7 is a front view of a duct piece of the sensor assembly.

With reference to FIG. 7, the sensor assembly 102 can include a duct piece 206. The duct piece 206 can include the first duct 198 (or a portion of the first duct 198) and the second duct 154. The duct piece 206 can be integral, i.e., made of a single, uniform piece of material with no seams, joints, fasteners, or adhesives holding it together. Having the first duct 198 and the second duct 154 made of a single part can help reduce dimensional stackup. For example, as shown in FIG. 6, the first duct 198 can be formed of the sensor window 106, specifically the remaining portion 146, and the duct piece 206. The duct piece 206 can form a radially outer wall of the first duct 198 relative to the axis A, and the remaining portion 146 of the sensor window 106 can form a radially inner wall of the first duct 198 relative to the axis A. Having airflow directly across the remaining portion 146 of the sensor window 106 can help carry away heat generated by the first sensor 104. The duct piece 206 can include a partially cylindrical surface 208 forming the radially outer wall of the first duct 198. The partially cylindrical surface 208 can extend along the axis A from the top edge of the sensor window 106 to the bottom edge of the sensor window 106 and can extend circumferentially around the axis A at a constant radius from the first inlet 200, i.e., the first end 114 of the circumferential portion 112 of the sensor window 106, to the first outlet 202, i.e., the second end 116 of the circumferential portion 112 of the sensor window 106.

Figure 8:
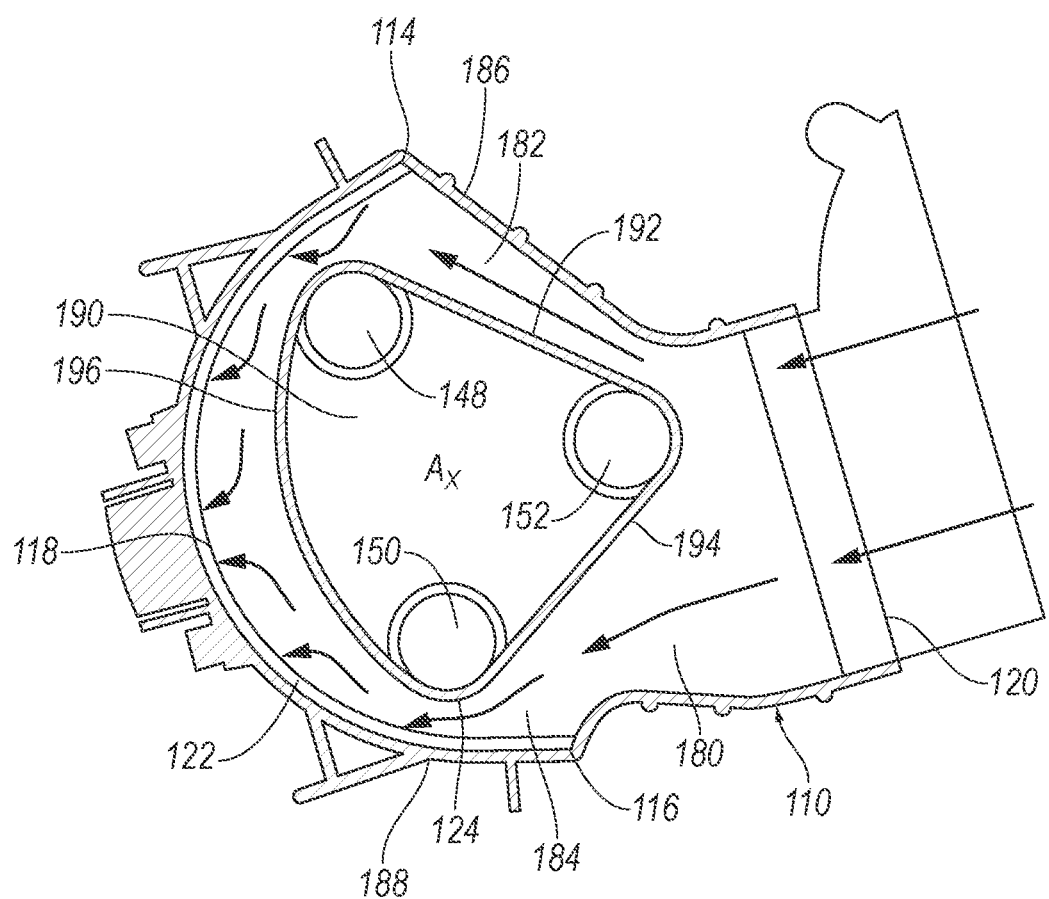
FIG. 8 is a top cross-sectional view through line 8-8 in FIG. 5 of a third duct of the sensor assembly.

With reference to FIG. 8, the third outlet 122 can extend circumferentially around the axis A from the first end 114 of the circumferential portion 112 to the second end 116 of the circumferential portion 112. The third outlet 122 can extend circumferentially greater than 180°. The third outlet 122 can have a constant width, i.e., measured radially relative to the axis A, from the first end 114 to the second end 116 of the circumferential portion 112.

The first fastener 148, the second fastener 150, and the third fastener 152 can extend through the third duct 110, e.g., through the bottom panel 190 of the duct deflector 124, within an area circumscribed by the duct deflector 124. The first fastener 148, the second fastener 150, and the third fastener 152 can be arranged in a triangle, i.e., not collinearly. The third fastener 152 can be positioned closer to the third outlet 122 than the first fastener 148 and second fastener 150 are.

The duct deflector 124 is positioned to direct airflow from the third inlet 120 to the third outlet 122 at the first end 114 and second end 116 of the circumferential portion 112 before the airflow reaches the midpoint 118 of the circumferential portion 112. For example, the duct deflector 124 can divide the third duct 110 into a first branch 182 and a second branch 184. The first branch 182 can extend along the duct deflector 124 to the first end 114 of the circumferential portion 112 and then circumferentially to the midpoint 118 of the circumferential portion 112. The second branch 184 can extend along the duct deflector 124 to the second end 116 of the circumferential portion 112 and then circumferentially to the midpoint 118 of the circumferential portion 112.

The duct deflector 124 can be positioned to direct the airflow from the third inlet 120 around the fasteners 148, 150, 152. The duct deflector 124 can include a first flat side 192 extending from the third fastener 152 to the first fastener 148. The duct deflector 124 can include a second flat side 194 extending from the third fastener 152 to the second fastener 150. The duct deflector 124 can include a third side 196 curving circumferentially around the axis A from the first flat side 192 to the second flat side 194, i.e., from the first fastener 148 to the second fastener 150. The first flat side 192, the second flat side 194, and the third side 196 of the duct deflector 124 can be connected together in a loop around the fasteners 148, 150, 152.

The first branch 182 can be formed of the top panel 178 above, the top surface 180 of the bracket 132 below, a first lateral wall 186 of the third duct 110 radially outward relative to the axis A, and the first flat side 192 and part of the third side 196 of the duct deflector 124 radially inward relative to the axis A. Having airflow directly across the top surface 180 of the bracket 132 can help carry away heat generated by the first sensor 104. The first flat side 192 is positioned to direct airflow from the third inlet 120 to the third outlet 122 at the first end 114 of the circumferential portion 112 before the airflow reaches the midpoint 118 of the circumferential portion 112. For example, the first end 114 of the circumferential portion 112 is partway along the first branch 182, and the midpoint 118 is at an end of the first branch 182. Once the airflow reaches the first end 114 of the circumferential portion 112, the airflow is split between exiting through the third outlet 122 and moving toward the midpoint 118. The duct deflector 124 can thus help significant airflow reach the first end 114 of the circumferential portion 112 of the sensor window 106, rather than the airflow being directed primarily toward the midpoint 118 as might occur in the absence of the duct deflector 124.

The second branch 184 can be formed of the top panel 178 above, the top surface 180 of the bracket 132 below, a second lateral wall 188 of the third duct 110 radially outward relative to the axis A, and the second flat side 194 and part of the third side 196 of the duct deflector 124 radially inward relative to the axis A. The second flat side 194 is positioned to direct airflow from the third inlet 120 to the third outlet 122 at the second end 116 of the circumferential portion 112 before the airflow reaches the midpoint 118 of the circumferential portion 112. For example, the second end 116 of the circumferential portion 112 is partway along the second branch 184, and the midpoint 118 is at an end of the second branch 184. Once the airflow reaches the second end 116 of the circumferential portion 112, the airflow is split between exiting through the third outlet 122 and moving toward the midpoint 118. The duct deflector 124 can thus help significant airflow reach the second end 116 of the circumferential portion 112 of the sensor window 106, rather than the airflow being directed primarily toward the midpoint 118 as might occur in the absence of the duct deflector 124.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor assembly comprising:
   a sensor including a sensor window;
   a cover fixed relative to the sensor, the cover being positioned to expose at least a portion of the sensor window;
   a bracket supporting the sensor;
   a duct extending around the sensor from an inlet at the cover adjacent to the sensor to an outlet at the cover adjacent to the sensor on an opposite side of the sensor from the inlet, the duct extending between the sensor and the bracket; and
   a deflector fixed relative to the sensor and spaced downwardly from the sensor, the deflector shaped to direct airflow toward the sensor.

2. The sensor assembly of claim 1, wherein the inlet is vehicle-forward of the sensor, and the outlet is vehicle-rearward of the sensor.

3. The sensor assembly of claim 1, wherein the duct extends vehicle-inboard of the sensor.

4. The sensor assembly of claim 1, wherein the deflector is positioned directly below and partially vehicle-rearwardly of the sensor.

5. The sensor assembly of claim 1, wherein the deflector slopes upward in a vehicle-rearward direction.

6. The sensor assembly of claim 1, wherein the sensor window is cylindrical and defines an axis, the cover is positioned to expose a circumferential portion of the sensor window, and the circumferential portion extends circumferentially relative to the axis from a first end adjacent to the cover to a second end adjacent to the cover.

7. The sensor assembly of claim 6, wherein the inlet of the duct is adjacent to the first end of the circumferential portion of the sensor window, and the outlet of the duct is adjacent to the second end of the circumferential portion of the sensor window.

8. The sensor assembly of claim 6, wherein the circumferential portion extends greater than 180° around the axis from the first end to the second end.

9. The sensor assembly of claim 6, wherein the sensor window includes a remaining portion extending behind the cover from the first end of the circumferential portion to the second end of the circumferential portion, and the duct extends circumferentially along the remaining portion.

10. The sensor assembly of claim 6, wherein the inlet is slot-shaped and is elongated parallel to the axis.

11. The sensor assembly of claim 10, wherein the inlet is elongated from a bottom edge of the sensor window to a top edge of the sensor window.

12. The sensor assembly of claim 6, wherein the outlet is slot-shaped and is elongated parallel to the axis.

13. The sensor assembly of claim 12, wherein the outlet is elongated from a bottom edge of the sensor window to a top edge of the sensor window.

14. The sensor assembly of claim 1, further comprising a frame member of a vehicle, wherein the bracket is fixed to the frame member.

15. The sensor assembly of claim 14, wherein the duct extends between the sensor and the frame member.

16. The sensor assembly of claim 1, wherein the duct is a first duct, the sensor assembly further comprising a second duct, wherein the second duct is positioned between the sensor and the bracket and extends transverse to the first duct.

17. The sensor assembly of claim 16, wherein the first duct is positioned between the sensor and the second duct.

18. The sensor assembly of claim 16, wherein the second duct includes a second inlet positioned at an intake port through the cover below the sensor.

19. The sensor assembly of claim 16, further comprising a blower mounted to the bracket and positioned to draw air into the second duct.

20. The sensor assembly of claim 1, wherein the sensor is a LIDAR device.

* * * * *